Figure 1:
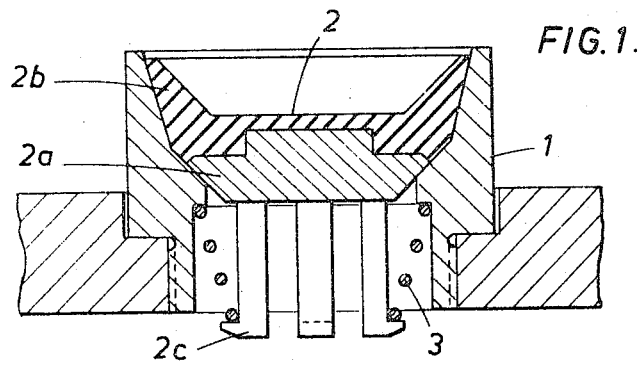

July 25, 1967  G. HALLÉN  3,332,437
VALVES

Filed Feb. 18, 1965  2 Sheets-Sheet 1

INVENTOR.
Gosta Hallen
BY Sommers + Young
Attorneys

United States Patent Office 3,332,437
Patented July 25, 1967

3,332,437
VALVES
Gösta Hallén, Barrvagen 5, Sollentuna, Sweden
Filed Feb. 18, 1965, Ser. No. 433,591
6 Claims. (Cl. 137—516.29)

This invention relates to valves for liquids with high content of relatively coarse solid particles.

More particularly, the present invention relates to a valve of this kind which comprises a movable valve body and a stationary seat with co-operating sealing surfaces and in which that portion of the valve body and of the seat which carries the portion of the respective sealing surfaces located closest to the axis of symmetry of said valve body is made of an inelastic material such as metal while that portion of the valve body and if desired of the seat, too, which carries the adjacent peripheral portion of said sealing surfaces is made of an elastic material such as rubber, and the co-operating sealing surfaces of the valve body and the seat are of double frusto-conical shape, the conical surface located closest to the axis of symmetry of the valve having a great top angle while the adjacent conical surface has a smaller top angle.

When pumping or otherwise handling liquids in which are present relatively coarse solid particles, it has since a long time been a major problem to provide a valve that has satisfactory sealing properties even at elevated pressures, in spite of the tendency of the solid particles to become stuck between the sealing surfaces of the valve when the valve is closed. Valves of this kind hitherto known have provided no satisfactory solution to overcome this problem and the drawbacks to which it gives rise, particularly the great wear of the sealing surfaces and the incapability of sealing effectively at high pressures when one or more solid particles are clamped between the sealing surfaces, this incapability being due to the fact that in order to be able to operate at all, these known valves must be guided with great nicety relatively to the seat, due to their design. Recently there have also been made attempts to use a valve with a valve body in the form of a freely movable ball of rubber, sometimes provided with a core of metal. Also this valve has turned out, however, to be unusable for pressures above 355 p.s.i.g. (25 atö.), and the ball-shaped valve body is subject to great wear.

An object of the present invention, therefore, is to eliminate the above-mentioned disadvantages. According to the invention, the valve of the kind referred to is substantially distinguished by the features that the dividing line between said two conical surfaces is disposed on the portion of the valve body made of elastic material and on the corresponding level on the seat so that any solid particles being present between the sealing surfaces of the valve body and the seat on closing of the valve either are embedded into the elastic material or cause a limited tilting of the valve body relatively to the seat, in which latter case a satisfactory sealing of the valve is still ensured by the elastic material.

The present invention thus provides for a valve which is not only durable and dependable but also capable of sealing efficiently at pressures exceeding 1700 p.s.i.g. (120 atö.) in spite of the presence of relatively coarse solid particles in the liquid flowing through the valve. It is a particular advantage that the body of this valve need not be guided with great exactness relatively to the seat but instead can advantageously be arranged movable in such a way that it can be slightly tilted in the seat in response to solid particles clamped between the sealing surfaces, satisfactory sealing yet being ensured also at very high pressures, owing to the valve design.

Figures 2, 3:
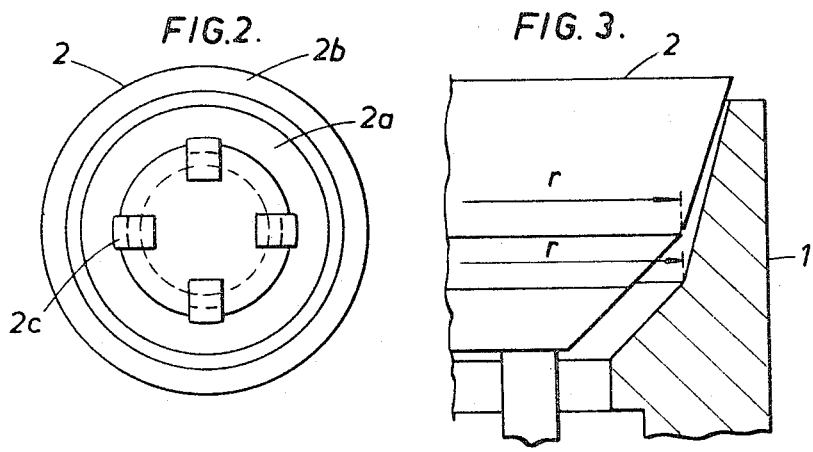
Figure 4:
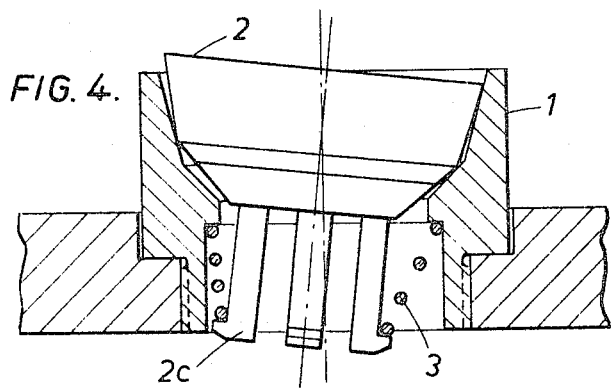
Figure 5:
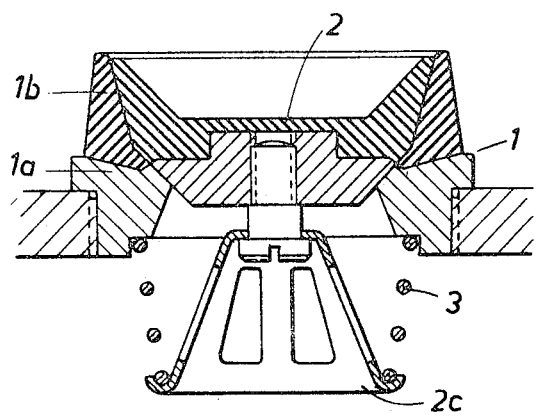
Figure 6:
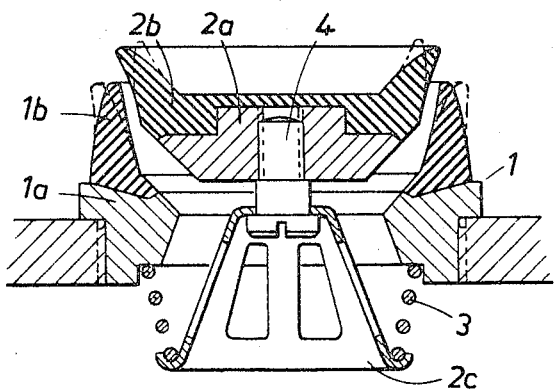

These and other objects will be apparent from the following description in connection with the accompanying drawings which, for illustrative purposes only, show two embodiments of the valve according to the invention and in which FIG. 1 is an elevational view in section of a first embodiment, FIG. 2 is a plan view from below of the valve according to FIG. 1, FIG. 3 is an elevational view in section of the same valve but illustrating the valve body in its open position, and FIG. 4 is an elevational view in section of the valve while closing in a tilted position relatively to the seat. FIGS. 5 and 6 are elevational views in the open and closed positions, respectively, of a second embodiment of the valve according to the invention, in which not only the valve body but also the seat is composed of inelastic and elastic material.

Referring now to the drawings and particularly FIGS. 1 to 4, the valve according to the invention comprises a stationary seat 1 and a movable valve body 2. The valve body 2 consists on one hand of a portion 2a which is made of an inelastic material, preferably metal, and on which is formed the portion of the sealing surfaces located closest to the axis of symmetry of the valve body, and on the other hand of a portion 2b carrying the adjacent peripheral portion of the same sealing surface and made of an elesatic material such as rubber. Both valve body portions 2a and 2b are rigidly secured to each other, in the case of metal/rubber for example by vulcanization. In the embodiment according to FIGS. 1 to 4 the seat 1 is made entirely of an inelastic material, preferably metal.

The mutually co-operating sealing surfaces of the valve body 2 and the seat 1 are of double frusto-conical shape, the conical surface closest to the axis of symmetry of the valve having a great top angle while the adjacent conical surface located radially outwardly thereof has a smaller top angle. The dividing line between these two conical surfaces is disposed on the portion 2b of elastic material. As seen particularly in FIG. 3, it is suitable that the dividing line between the conical surfaces has the same radius on the valve body 2 and on the seat 1 and that the conical surface of the valve body 2 having the smaller top angle has a slightly greater top angle than the corresponding conical surface of the seat 1. By this arrangement it is achieved that the radially outermost edge of the valve body 2 will be the first portion engaging the seat on closing of the valve and thus a satisfactory engaging pressure is ensured between valve body and seat. It is preferable, too, that the portion 2b of the valve body which is made of an elastic material be cup-shaped with the cup opening turned away from the adjoining portion 2a of the inelastic material.

Although the valve body 2 of the valve described above of course can be exactly guided axially by any suitable means during its closing and opening movements, it is a particularly advantageous feature of the present valve that a satisfactory sealing is provided also when the valve body 2 is tilted to a limited extent relatively to the seat 1 (FIG. 4). The only guiding then necessary can be obtained by means of a conical pressure coil spring 3 which acts from the seat 1 on an elongation 2c of the valve body 2. This elongation in the embodiment shown in FIGS. 1 to 4 of the drawings consists of four legs integral with the valve body portion 2a of inelastic material. The conical spring 3 is directed with its top in the same direction as the conical sealing surfaces of the valve body 2 and the seat 1.

In FIGS. 5 and 6 of the drawings there is illustrated another embodiment of the valve according to the present invention in which also the seat 1 in correspondence to the valve body 2 is composed of a portion 1a of inelastic material, preferably metal, and a portion 1b rigidly secured thereto and made of an elastic material such as rubber. The portion 1a carries the portion of the sealing surface of the seat closest to the axis of symmetry of the valve and the portion 1b carries the adjacent portion of the same sealing surface located radially outwardly thereof. In this embodiment, too, the dividing line between the two conical surfaces is disposed in the elastic material. In this embodiment the elongation 2c of the valve body 2, which the spring 3 engages, is illustrated as formed by a cup-shaped spring support member connected by a screw 4 with the valve body portion 2a of inelastic material.

In this second embodiment of the valve according to the invention in which both the conical sealing surfaces of the valve body 2 and the seat 1 are formed on the portions 2b and 1b, respectively, of elastic material, it is preferable in some cases that the radially outermost portions of said conical surfaces be somewhat curved radially outwardly and inwardly, respectively, in the open position of the valve, so as to ensure a really efficient and strong mutual engagement of these two surfaces when the valve is closed.

The valve according to the present invention is particularly suitable for use in mud pumps for rock drilling, cement pumps, etc., as well as in other cases where great quantities of solid particles are present in the liquid which is being pumped. By the feature that the radially outer portion of at least one of the two co-operating sealing surfaces of the valve body 2 and the seat 1 is formed on a portion of these elements made of elastic material, it is achieved that solid particles which are being clamped in this portion on closing of the valve are substantially embedded in the elastic material, thus ensuring a satisfactory sealing. At the same time the two co-operating portions of said sealing surfaces formed on the inelastic material and disposed closet to the axis of symmetry of the valve will ensure a final, non-yielding engagement of these surfaces. The co-operation of the elastic and inelastic portions of the valve body and the seat provides for a satisfactory sealing also when one or more solid particles happen to be caught between the portions of the sealing surfaces of the valve body 2 and the seat 1 formed on the portions thereof which are made of inelastic material, and the valve body 2 thereby tilted relatively to the seat 1.

In a practical embodiment of the valve structure according to FIGS. 1 to 4 of the drawings there was used a seat 1 entirely made of tempered chromium steel SIS 2303 (13.5% chromium). The portion 2a of the valve body 2 was also made of this steel while the portion 2b was made of an oil-resistant rubber material of 35° Shore. With a valve opening of 40 mm. diameter this valve has exhibited a satisfactory sealing when the liquid flowing therethrough had high content of solid particles having a maximum diameter of 3 mm., but with greater dimensions of the valve the same satisfactory sealing still can be achieved when passing therethrough solid particles of a correspondingly greater diameter. This valve has been tested in a pump with 235 strokes/minute continuously for ten days, that is 3.3 million strokes, without any appreciable wear of the sealing surfaces or any decrease in the sealing capacity.

I claim:

1. A valve, particularly for control of liquids having a high content of relatively coarse solid particles carried thereby, and comprising a movable valve body and a stationary seat provided with co-operating sealing surfaces, in which valve that portion of the valve body and of the seat which carries the portion of the respective sealing surfaces located closest to the axis of symmetry of said valve body is made of an inelastic material while that portion of the valve body and of the seat, too, which carries the adjacent peripheral portion of said sealing surfaces if made of an elastic material, the co-operating sealing surfaces of the valve body and of the seat being or double frusto-conical shape, the conical surfaces located closest to the axis of symmetry of the valve body having a large top angle while the adjacent conical surfaces have a smaller top angle, the dividing line between the two conical surfaces of said valve body being disposed on the portion of said valve body made of elastic material and said dividing line of said body being located on the corresponding level of the seat when closed so that any solid particles which are present between the sealing surfaces of the valve body and the seat on closing of the valve are either embedded into the elastic material or cause a limited tilting of the valve body relatively to the seat, in which latter case a satisfactory sealing of the valve is still ensured by the elastic material.

2. A valve, particularly for control of liquids having a high content of relatively coarse solid particles carried thereby and comprising a movable valve body and a stationary seat provided with co-operating sealing surfaces, in which valve that portion of the valve body and of the seat which carries the portion of the respective sealing surfaces located closest to the axis of symmetry of said valve body is made of metal while that portion of the valve body and of the seat, too, which carries the adjacent peripheral portion of said sealing surfaces is made of an elastic material, the co-operating sealing surfaces of the valve body and of the seat being of double frusto-conical shape, the conical surfaces located closest to the axis of symmetry of the valve body having a large top angle while the adjacent conical surfaces have a smaller top angle, the dividing line between the two conical surfaces of said valve body being disposed on the portion of said valve body made of elastic material and said dividing line of said body being located on the corresponding level of the seat when closed so that any solid particles which are present between the sealing surfaces of the valve body and the seat on closing of the valve are either embedded into the elastic material or cause a limited tilting of the valve body relatively to the seat, in which latter case a satisfactory sealing of the valve is still ensured by the elastic material.

3. A valve, particularly for control of liquids having a high content of relatively coarse solid particles carried thereby, and comprising a movable valve body and a stationary seat provided with co-operating sealing surfaces, in which valve that portion of the valve body and of the seat which carries the portion of the respective sealing surfaces located closest to the axis of symmetry of said valve body is made of an inelastic material while that portion of the body which carries the adjacent peripheral portion of said sealing surfaces is made of an elastic material, the co-operating sealing surfaces of the valve body and of the seat being of double frusto-conical shape, the conical surfaces located closest to the axis of symmetry of the valve body having a large top angle while the adjacent conical surfaces have a smaller top angle, the dividing line between the two conical surfaces of said valve body being disposed on the portion of said valve body made of elastic material and said dividing line of said body being located on the corresponding level of the seat when closed so that any solid particles which are present between the sealing surfaces of the valve body and the seat on closing of the valve are either embedded into the elastic material or cause a limited tilting of the valve body relatively to the seat, in which latter case a satisfactory sealing of the valve is still ensured by the elastic material.

4. A valve as claimed in claim 3, and in which the elastic material of said portion of said body is rubber.

5. A valve according to claim 3, characterized in that the dividing line between the two conical surfaces of the valve body and of the seat respectively have the same radius on the valve body and on the seat and in that the conical surface of the valve body having the smaller top angle has a slightly greater top angle than the corresponding conical surface of the seat, so that the radially outermost edge of the valve body will be the first portion engaging the seat on closing of the valve, the portion of the valve body made of elastic material being cup-shaped with its cup opening turned away from the adjoining portion of said valve body made of inelastic material.

6. A valve according to claim 3 and in which the valve body is guided only by a conical coil spring acting between said body and said seat allowing the limited tilting of the valve body relatively to the seat and acting from the seat on an elongation of the valve body, said conical spring being directed with its top facing in the same direction as said conical sealing surfaces of said seat.

References Cited

UNITED STATES PATENTS

| | | | |
|---|---|---|---|
| 1,942,417 | 1/1934 | Ferlin | 251—129 |
| 2,011,812 | 8/1935 | Hatcher | 251—144 |
| 2,613,054 | 10/1952 | Haier | 251—332 |
| 2,745,631 | 5/1956 | Shellman | 251—333 |
| 2,918,078 | 12/1959 | Cummings | 251—333 |
| 3,001,546 | 9/1961 | Salisbury | 137—541 |

FOREIGN PATENTS 643,111 6/1962 Canada.

WILLIAM F. O'DEA, *Primary Examiner.*

W. H. WRIGHT, *Assistant Examiner.*